United States Patent [19]

Shih-Yuan Ro

[11] 3,846,371
[45] Nov. 5, 1974

[54] MASTERBATCHING ELASTOMER BLENDS

[75] Inventor: Rolland Shih-Yuan Ro, Wilmington, Del.

[73] Assignee: E. I. du Pont de Nemours & Co., Wilmington, Del.

[22] Filed: Apr. 9, 1973

[21] Appl. No.: 349,303

[52] U.S. Cl....... 260/42.33, 152/330, 260/33.6 AQ, 260/889, 260/890, 260/42.34
[51] Int. Cl......................... C08c 11/18, C08d 9/08
[58] Field of Search.......................... 260/889, 415 R

[56] References Cited
UNITED STATES PATENTS
3,224,985   12/1965   Gladding et al. ................... 260/889
FOREIGN PATENTS OR APPLICATIONS
962,519   7/1964   Great Britain Primary Examiner—Morris Liebman
Assistant Examiner—H. H. Fletcher
Attorney, Agent, or Firm—Michael Conner

[57] ABSTRACT

This invention relates to a process for preparing vulcanizates from blends of incompatible elastomers using a mutual curing system in which the mixing of each elastomeric component of the blend separately, with a carbon black selected to optimize the desired vulcanizate properties of the final blend, is completed prior to blending the resulting black-containing elastomeric mixes into the final mixture. Using this procedure it is possible to prepare vulcanizates that have higher tensile strength than those prepared by mixing simultaneously carbon black and all components of the mixture.

5 Claims, No Drawings

MASTERBATCHING ELASTOMER BLENDS

BACKGROUND OF THE INVENTION

It has been known for a considerable length of time that one may blend various elastomers to achieve a resulting blend whose characteristics reflect the contribution of the several elements of the blend. For instance, if the ozone resistance of one elastomer is superior to another elastomer and they are blended in roughly equal proportions the resulting blend will have ozone resistance which would be intermediate between that of the two elastomers.

A problem which has been encountered when preparing blends of various elastomers is that certain physical properties, such as tensile strength, will be substantially inferior to that of the elastomer having the higher tensile strength in the blend. That is to say, the property will usually be well below an average of the several tensile strengths attributable to the components of the blend.

Typically, each elastomer in such prior art blends is masterbatched with the same filler or carbon black. This may be done by: 1) masterbatching each elastomer with the same filler and then blending the masterbatches; 2) masterbatching each elastomer with the same mixture of fillers and blending the masterbatches; and 3) mixing one or more fillers with the combined elastomers at the same time.

It is thought that these procedures lead to unequal reinforcement of the elastomer phases by the fillers since carbon blacks tend to demonstrate varying degrees of affinity toward the various elastomers of the mixture. Because of this variance in affinity, the properties of the various elastomers, e.g. tensile strength, ozone resistance, are not all maximized and the resulting properties of the entire blend will reflect at best a proportionate reduction.

Thus a method is needed for preparing a homogeneous carbon-black containing blend of elastomers in which the properties of the blend are maximized by adding to the individual elastomers a carbon black which maximizes the desired vulcanizate properties.

According to this invention it has unexpectedly been found that if one adds to the individual elastomeric polymers which are to be used in an elastomeric blend, prior to blending, a carbon black which optimizes the desired properties of the elastomer, e.g. tensile properties, and then blends the several carbon black-containing elastomers prior to curing, following the cure a blended elastomer is recovered which has optimum physical properties, e.g., tensile properties, in addition to the other advantages obtained by blending the particular elastomers.

This technique may be used with any blend of two or more elastomers but in a preferred embodiment of the instant invention, which typifies the improvement thereof, chloroprene polymer which is a common name for synthetic rubber made by polymerization of 2-chloro-1,3-butadiene, may be blended with a polymer of ethylene, propylene and at least one non-conjugated diene (EPDM).

The tensile properties of vulcanized EPDM are optimized by the addition of a high reinforcing carbon black since the polymer has low gum tensile strength; chloroprene polymer, conversely, requires a less reinforcing carbon black to achieve comparable tensile properties to that of EPDM because the chloroprene polymer has relatively high gum tensile strength. Such a black is referred to as a semi-reinforcing black.

By high reinforcing carbon black is meant a carbon black having the following characteristics: small particle size, about 200–300 A diameter and large surface area, about 70–130 sq. meters/gm. High reinforcing blacks are made generally by the well known chemical process or oil furnace process. A low reinforcing black has the following general characteristics: large particle size, about 1,500–5,000 A diameter, and small surface area, about 5–20 sq. meters/gm. Low reinforcing blacks are made generally by the well known thermal process. The neoprene is reinforced with a semi-reinforcing black of intermediate particle size, about 500–900 A diameter, and about 21–40 sq. meters/gm. area. The blacks are blended into the elastomers by a variety of well known means such as mastication on a rubber mill or in an internal mixer. Additional ingredients are added in the same manner. The two elastomer-black mixes are then combined using the same type of mixing operations. The resulting elastomeric mixture is then cured by conventional techniques and a vulcanizate recovered which has improved tensile strength and often improved tear strength.

DETAILED DESCRIPTION

The instant invention is applicable to any blends of at least two elastomers of different gum tensile properties; it should be emphasized, however, that it is preferred to utilize the invention with a blend of a chloroprene polymer and a linear branched polymer of ethylene, propylene and at least one non-conjugated diene (EPDM). Other blends which may be improved by the instant invention include: chloroprene polymer/modified EPDM such as allylically brominated EPDM and chloroprene polymer/butyl rubber.

The invention will, however, be discussed in terms of the previously mentioned chloroprene polymer-EPDM blend since it typifies the improvement which may be achieved.

In more detail, the chloroprene polymer having a Mooney viscosity (ML 1+4/250°F) range of about 20 to 150, preferably 40 to 100, is combined with a semi-reinforcing carbon black. Useful chloroprene polymers are prepared using the procedures of the following U.S. Pat. Nos. 2,494,087; 3,105,055; 3,397,173 which are herein incorporated by reference. The black is added in the form of particles having an average size of about 500–900 A diameter and in the amount of about 10 to 200 parts of carbon black parts per one hundred rubber, preferably about 50–100, by adding it directly to a polymer banded on a rubber mill or by adding with a polymer in an internal mixer. Typical carbon blacks which may be utilized include the following: medium thermal and semireinforcing furnace blacks. The other elastomer which is to be blended with the chloroprene polymer is composed of ethylene, propylene and at least one nonconjugated diene. Typically, the elastomer contains 30–75 weight percent ethylene, about 20–60 weight propylene and up to 10 weight percent of at least one nonconjugated diene. The nonconjugated diene can be a cyclic diene such as dicyclopentadiene, cyclooctadiene, 5-alkenyl-substituted 2-norbornenes (e.g. 5-propenyl-2-norbornene), and 5-alkylidene-2-norbornenes (e.g. 5-ethylidene-2-norbornene). Of the cyclic dienes, 5-ethylidene-2-norbornene is especially preferred. Open chain non-conjugated dienes may also be utilized and it is preferred that the diene contain about 6–22 carbon atoms. Representative dienes are 1,4-hexadiene, 1,5-octadiene, 9-ethyl-1,9-undecadiene, 12-ethyl-1,2-tetradecadiene and 15-ethyl-1,15-heptadecadiene.

Particularly preferred are terpolymers of ethylene, propylene and open-chain nonconjugated diene having both terminal and internal unsaturation. Such dienes are known in the art as monoreactive dienes. Under polymerization conditions the terminal unsaturation of the monoreactive diene copolymerizes with ethylene and propylene monomers to form a terpolymer having an essentially saturated backbone. Terpolymers of ethylene, propylene and 1,4-hexadiene are especially preferred. The ethylene-propylene-diene terpolymers can be prepared by copolymerization of the monomers in an inert solvent using a coordination catalyst system such as diisobutylaluminum chloride and vanadium oxychloride. Details of their preparation are given in U.S. Pat. Nos. 2,933,480; 3,000,086; 3,260,708; 3,423,028; 3,635,919 and 3,637,616 all of which are herein incorporated by reference. A high reinforcing carbon black is then added to the resulting polymer by means of mixing in an internal mixer or on a rubber mill. Particularly preferred high reinforcing blacks are the following: super abrasion furnace black and high abrasion furnace black.

The blends may contain 5–95 parts of one component and 95–5 parts of the other. Proportions may be varied in accordance with the desired properties of the blend which is being produced.

The resulting masterbatches, containing the most desirable carbon blacks, are then blended together on a mill or in an internal mixer at a temperature of about 25°–150°C by means well known in the art. Prior to or after blending curing agents, processing aids and antioxidants may be added.

The blended elastomers or elements of the blend are then cured. Curing may take place by any conventional technique. Typically, curing will take place at a temperature of 140°–200°C, preferably 150°–180°C for a period of about 5–120 min., preferably 20–40 min. The following combinations of curing agents are examples of systems useful for the vulcanization of EPDM rubber and chloroprene polymer blends:

| (1) | Sulfur | 1.5 | phr. |
| | Tetramethylthiuram monosulfide | 1.5 | |
| | 2-Mercaptobenzothiazole | 0.5 | |
| (2) | Sulfur | 2 | |
| | Tetramethylthiuram disulfide | 0.75 | |
| | Dipentamethylenethiuram tetrasulfide | 0.75 | |
| | 2-Mercaptobenzothiazole | 1.5 | |
| (3) | Sulfur | 2 | |
| | Tetramethylthiuram disulfide | 0.75 | |
| | Dipentamethylenethiuram tetrasulfide | 0.75 | |
| | Tellurium diethyldithiocarbamate | 0.75 | |
| | 2-Mercaptobenzothiazole | 1.5 | |
| (4) | Sulfur | 2.5 | |
| | Zinc dimethyldithiocarbamate | 2.5 | |
| | Zinc benzothiazyl sulfide | 0.5 | |
| (5) | Sulfur | 2.5 | |
| | Zinc dimethyldithiocarbamate | 1.75 | |
| | Tetramethylthiuram disulfide | 1.75 | |
| | Zinc benzothiazyl sulfide | 0.5 | |
| (6) | Tetramethylthiuram disulfide | 1 | |
| | Dipentamethylenethiuram tetrasulfide | 3 | |
| | 2-Mercaptobenzothiazole | 1 | |

The amount of curing agent may be varied within ranges obvious to one skilled in the art.

Suitable antioxidants which may be added are phenolic antioxidants such as 2,6-di-t-butyl-p-phenylphenol, 2,6-di-t-butyl-p-cresol and amine antioxidants such as N-phenyl-1-naphthyl amine and N-phenyl-2-naphthyl amine.

The resulting vulcanized blend would be useful for the following purposes: tire side walls, foams, wire coating and tubing.

In the following examples all parts and proportions are by weight.

EXAMPLE 1

One hundred parts of an alkylmercaptan modified polychloroprene rubber was mixed on a two roll mill with 0.5 part stearic acid, 2 parts phenyl-α-naphthylamine, 4 parts magnesium oxide, 58 parts SRF carbon black, 10 parts of an aromatic oil sold as Sundex 790 oil by Sun Oil Co., 5 parts zinc oxide, 1.5 parts bis(octadecyl isopropyl)thiuram disulfide, 3 parts dipentamethylenethiuram tetrasulfide and 1 part 2-mercaptobenzothiazole. Test specimens were cured in a press for 30 min. at 152°C. Samples were tested by standard methods (ASTM D-412). One hundred parts of EPDM, an ethylene/32 wt. percent propylene/4 wt. percent 1,4-hexadiene terpolymer, of Mooney viscosity (ML 1+4, 250°F.) 58, was compounded with the same ingredients and cured in the same manner as described above. 50 parts of the polychloroprene and 50 parts of the EPDM were mixed thoroughly on a two roll mill and then compounded with the same ingredients and cured as described above. Tensile properties of all three samples are shown in Table I.

Table I

| | Tensile Properties | | |
|---|---|---|---|
| | Polychloroprene | EPDM | 50/50 Blend |
| Tensile at Break, psi. | 2850 | 1850 | 2330 |
| Modulus at 100% Elongation, psi. | 600 | 350 | 500 |
| Elongation at Break, % | 320 | 300 | 340 |

This example illustrates that the vulcanizate of the raw polymer mill blend has tensile strength intermediate between those of the two individual components, but substantially inferior to the component of higher tensile strength.

EXAMPLE 2

A blend of equal weight proportions of the polychloroprene and the EPDM masterbatches of Example 1 was mixed on a mill, and cured and tested as in that Example. The following results were obtained: tensile at break was 2,200 psi, modulus at 100 percent elongation was 500 psi. and elongation at break was 320 percent.

This example illustrates that no improvement in the tensile strength is obtained with blends of separate masterbatches reinforced with the same carbon black.

EXAMPLE 3

Polychloroprene and EPDM masterbatches were prepared using the ingredients shown in Table II by the procedure of Example 1. The tensile properties of their vulcanizates after curing and testing as in Example I are also shown in Table II. A blend of the two masterbatches was then mixed on the mill to give a resulting stock with the same polymer ratio (50/50) as the blend in Table I.

Table II

Compounding Recipes for the Masterbatches:

| | | |
|---|---|---|
| A. | Polychloroprene of Example I | 100 |
| | Stearic acid | 0.5 |
| | Phenyl-α-naphthylamine | 2 |
| | Magnesium oxide | 4 |
| | SRF carbon black | 58 |
| | Sundex 790 Oil | 10 |
| | Zinc oxide | 5 |
| | Tetramethylthiuram disulfide | 1 |
| | Dipentamethylenethiuram tetrasulfide | 3 |
| | 2-Mercaptobenzothiazole | 1 |
| B. | EPDM of Example I | 100 |
| | HAF carbon black | 60 |
| | Sundex 790 Oil | 20 |
| | Zinc oxide | 5 |
| | Tetramethylthiuram disulfide | 1 |
| | Dipentamethylenethiuram tetrasulfide | 3 |
| | 2-Mercaptobenzothiazole | 1 |

Press cure: 30 min. at 150°C.

Tensile Properties

| | Polychloroprene | EPDM | 50/50 Blend |
|---|---|---|---|
| Tensile at break, psi. | 2870 | 2650 | 2760 |
| Modulus at 100% elongation, psi. | 500 | 460 | 410 |
| Elongation at break, % | 440 | 310 | 420 |

This example illustrates the improvement in tensile strength obtained with blends of optimumly reinforced masterbatches wherein two different elastomers are separately compounded with two different carbon blacks.

One of the major advantages of polychloroprene/EPDM blends is that the blends exhibit improved ozone resistance as compared to 100 percent polychloroprene. For example, the above polychloroprene vulcanizate developed severe cracking after about 20 hrs. exposure to 3 ppm ozone, while the 50/50 blend only showed trace signs of cracks under a microscope after 178 hrs. exposure under the same conditions. Using the blending technique described in this example, blend compositions with good ozone resistance can be obtained without detrimental sacrifice of the tensile strength.

EXAMPLE 4

The compounding recipes and the tensile properties are shown in Table III. The compounding, vulcanization, and testing procedures were those of Example 3.

Table III

Compounding Recipes

| | | |
|---|---|---|
| A. | Polychloroprene of Example I | 100 |
| | Stearic acid | 0.5 |
| | Phenyl-α-naphthylamine | 2 |
| | Magnesium oxide | 4 |
| | SRF carbon black | 58 |
| | Sundex 790 Oil | 10 |
| | Zinc oxide | 5 |
| | Sulfur | 3 |
| | Tetramethylthiuran disulfide | 1 |
| | 2-Benzothiazolyl disulfide | 2 |
| | Zinc salt of dibutyldithiocarbamate | 4 |
| B. | EPDM of Example I | 100 |
| | HAF carbon black | 60 |
| | Sundex 790 Oil | 20 |
| | Zinc oxide | 5 |
| | Sulfur | 3 |
| | Tetramethylthiuram disulfide | 1 |
| | 2-Benzothiazolyl disulfide | 2 |
| | Zinc salt of dibutyldithiocarbamate | 4 |

Press cure: 30 min. at 152°C.

Tensile Properties

| | Polychloroprene | EPDM | 50/50 Blend |
|---|---|---|---|
| Tensile at break, psi. | 2670 | 2600 | 2870 |
| Modulus at 100% elongation, psi. | 260 | 410 | 400 |
| Elongation at break, % | 640 | 315 | 420 |

This example illustrates further that improvement in tensile strength can be obtained with blends of optimumly reinforced masterbatches as in Example 3 but using a different curing system.

EXAMPLE 6

The ingredients listed in Table IV were processed as described in Example 3. Testing results are also shown in the table.

Table IV

Compounding Recipes

| | | |
|---|---|---|
| A. | Polychloroprene of Example 1 | 100 |
| | HAF carbon black | 50 |
| | Sundex 790 Oil | 20 |
| | Stearic acid | 0.5 |
| | Phenyl-α-naphthylamine | 2 |
| | Magnesium oxide | 4 |
| | Zinc oxide | 5 |
| | Tetramethylthiuram disulfide | 1 |
| | Dipentamethylenethiuram tetrasulfide | 3 |
| | 2-mercaptobenzothiazole | 1 |
| B. | EPDM of Example 1 | 100 |
| | HAF carbon black | 70 |
| | Sundex 790 Oil | 20 |
| | Zinc oxide | 5 |
| | Tetramethylthiuram disulfide | 1 |
| | Dipentamethylenethiuram tetrasulfide | 3 |
| | 2-mercaptobenzothiazole | 1 |

Tensile Properties

| | Polychloroprene | EPDM | 50/50/Blend |
|---|---|---|---|
| Tensile at break. psi. | 3320 | 3070 | 2880 |
| Modulus at 100% elongation, psi. | 480 | 380 | 450 |
| Elongation at break % | 480 | 480 | 450 |

EXAMPLE 5

All the ingredients of Example 4 for both masterbatches were mixed on a mill together. The resulting vulcanizate after curing as in Example 4 and testing as in Example 1 had tensile at break of 2,500 psi., modulus at 100 percent elongation of 550 psi. and elongation at break of 330 percent.

This example illustrates that as compared to the raw polymer mill blends little or no improvement in tensile strength is obtained when all the compounding ingredients including the two polymers are mixed at the same time.

This example illustrates that improvement in tensile strength of a blend can also be obtained through balanced reinforcement of two polymers by separately masterbatching with the same carbon black and plasticizing oil but at different loadings.

Polychloroprene has a higher affinity toward the carbon black and is more highly reinforced than EPDM. Therefore, a lower loading of carbon black is polychloroprene than that in the EPDM is necessary to achieve balanced reinforcement in both phases in the blend.

EXAMPLE 7

The compounding recipes and the tensile properties

Table V

Compounding Recipes

| | | |
|---|---|---|
| A. | Polychloroprene of Example 1 | 100 |
| | Stearic acid | 0.5 |
| | Phenyl-α-naphthylamine | 2 |
| | Magnesium oxide | 4 |
| | SRF carbon black | 58 |
| | Sundex 790 Oil | 10 |
| | Zinc oxide | 5 |
| | Ethylene thiourea | 0.75 |
| | Tetramethylthiuram disulfide | 0.75 |
| B. | Allylically brominated EPDM | 100 |
| | Stearic acid | 0.5 |
| | Magnesium oxide | 4 |
| | HAF carbon black | 50 |
| | Sundex 790 Oil | 15 |
| | Zinc oxide | 5 |
| | Ethylene thiourea | 1 |

Press cure: 30 min. at 152°C.

Table V—Continued

Tensile Properties

| Original. Tested at 25°C. | Polychloroprene | Brominated EPDM | 50/50 Blend |
| --- | --- | --- | --- |
| Tensile at break. psi. | 3130 | 3370 | 3050 |
| Modulus at 100% elongation, psi. | 760 | 440 | 640 |
| Elongation at break, % | 305 | 325 | 335 |
| % Compression set after 70 hrs. at 100°C. | 32 | 29 | 35 |
| *After Heat-Aged 3 Days at 121°C. & Tested at 25°C.* | | | |
| Tensile at break, psi. | 3020 | 3440 | 3070 |
| Modulus at 100% elongation, psi. | 1100 | 550 | 810 |
| Elongation at break, % | 245 | 295 | 285 |
| % Compression set after 70 hrs. at 100°C. | 17 | 22 | 22 | of the vulcanizates are shown in Table V. The procedures used were those of Example 3.

This example illustrates that the high tensile strength of a blend of polychloroprene and allylically-brominated EPDM is obtained with the same blending technique as described in Example 3.

EXAMPLE 8

This example illustrates the method of preparation of allylically brominated EPDM. A solution of 160 g. EPDM of Example 1 in about 4 l. carbon tetrachloride was heated to 78°C. under nitrogen with mechanical stirring. N-Bromosuccinimide (5.7 g) and 0.2 g benzoyl peroxide were added. The resulting mixture was heated under reflux for two hours and then cooled to room temperature. The product was isolated by drum drying. The polymer was analyzed and contained 1.4 wt. percent total bromine and 1.2 wt. percent allylic bromine.

What is claimed is:

1. A process for blending a chloroprene elastomeric polymer and an elastomeric polymer or its allylically brominated derivative comprising ethylene, propylene and at least one non-conjugated diene which consists essentially of separately adding to said chloroprene polymer a semi-reinforcing black, and adding a high reinforcing black to the ethylene containing polymer, blending the two black containing elastomers in the uncured state, curing the elastomers in the presence of one or more curing agents compatible with the elastomers in the blend and recovering a blend of elastomers having at least one optimized property.

2. The process of claim 1 wherein said non-conjugated diene is 1,4-hexadiene.

3. The process of claim 1 wherein said blending takes place in a rubber mill or an internal mixer.

4. The process of claim 1 wherein the high reinforcing black is selected from super abrasion furnace black and high abrasion furnace black.

5. The process of claim 4 wherein the semi-reinforcing black is selected from medium thermal and semi-reinforcing furnace black.

* * * * *